United States Patent
Fulmer et al.

(10) Patent No.: US 7,769,976 B2
(45) Date of Patent: Aug. 3, 2010

(54) IDENTIFYING CODE THAT WASTES VIRTUAL MEMORY

(75) Inventors: Cindy D. Fulmer, Sunnyvale, CA (US); Victor Havin, Mountain View, CA (US); Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 11/609,360

(22) Filed: Dec. 12, 2006

(65) Prior Publication Data

US 2008/0140978 A1 Jun. 12, 2008

(51) Int. Cl.
G06F 13/00 (2006.01)
G06F 13/28 (2006.01)
G06F 9/46 (2006.01)

(52) U.S. Cl. ....................... 711/170; 718/104
(58) Field of Classification Search ............... 711/170; 718/104
See application file for complete search history.

(56) References Cited

U.S. PATENT DOCUMENTS

| | | | |
|---|---|---|---|
| 5,559,980 | A | 9/1996 | Connors et al. |
| 6,324,631 | B1 | 11/2001 | Kuiper |
| 6,526,421 | B1 | 2/2003 | Houldsworth |
| 6,898,634 | B2 | 5/2005 | Collins et al. |
| 7,007,049 | B2 | 2/2006 | Peng |
| 2003/0163661 | A1 * | 8/2003 | Marion et al. ............... 711/170 |
| 2005/0283771 | A1 | 12/2005 | Paller |

FOREIGN PATENT DOCUMENTS

WO WO2004095457 A2 11/2004

OTHER PUBLICATIONS

Rational Purify, 199-2001, http://bmrc.berkeley.edu/purify/docs/html/installing_and_gettingstarted/2-purify.html.*
Boyle et al., Space Reclamation in Virtual Storage Systems, IBM Technical Disclosure Bulletin, pp. 2582-2383, Jan. (1976).
Parasoft, "Avoiding C/C++ Dynamic Memory Problems with Parasoft Inuse", <http://www.parasoft.com/jsp/printables/InusePaper.pdf?path=/jsp/products/article.jsp> (visited Dec. 1, 2006).
Sun, "visualgc—Visual Garbage Collection Monitoring Tool", <http://java.sun.com/performance/jvmstat/visualgc.html> (visited Dec. 1, 2006).

* cited by examiner

Primary Examiner—Hetul Patel
Assistant Examiner—Edward J Dudek, Jr.
(74) Attorney, Agent, or Firm—Cuenot, Forsythe & Kim, LLC

(57) ABSTRACT

A method of runtime analysis of a computer program can include detecting allocations of virtual memory regions during runtime of the computer program. An entry can be created in a list of existing virtual memory regions for each allocation of a virtual memory region during runtime. The list can be updated, during runtime, according to usage of the virtual memory regions. Virtual memory regions allocated to, but not used by, the computer program can be indicated according to the list.

17 Claims, 2 Drawing Sheets

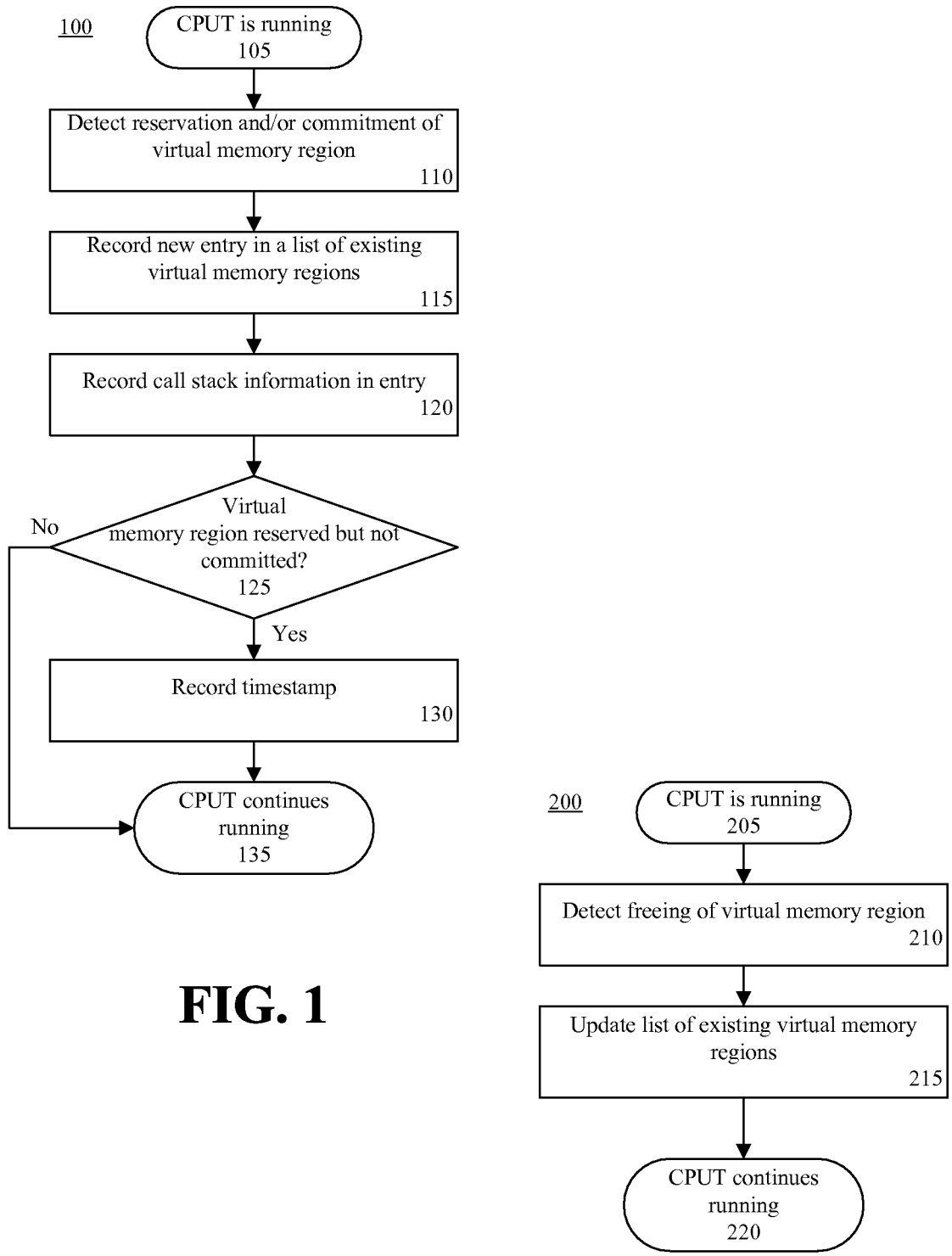

IDENTIFYING CODE THAT WASTES VIRTUAL MEMORY

BACKGROUND OF THE INVENTION

Runtime analysis tools are commonly used in software development to evaluate the behavior of computer programs. Runtime analysis refers to the practice of understanding computer program behavior using data collected during execution of a computer program. Typically, program code is compiled using the runtime analysis tool. The runtime analysis tool instruments the computer program, referred to as the computer program under test, with additional code that can perform various monitoring tasks and reporting functions that can or may work cooperatively with the runtime analysis tool itself.

Virtual memory, in general, refers to the manner in which computer programs access memory resources of a computer system. Most modern operating systems reference memory using virtual memory addresses which are translated into real random access memory addresses. For the most part, only core portions of the kernel of an operating system are able to access real memory addresses directly. If improperly managed, a computer program can run out of virtual memory. When virtual memory is depleted, the computer program often exhibits unexpected and erratic behavior. In other cases, the computer program completely crashes.

BRIEF SUMMARY OF THE INVENTION

The present invention relates to a method of runtime analysis of a computer program. The method can include detecting allocations of virtual memory regions during runtime of the computer program and creating an entry within a list of existing virtual memory regions for each allocation of a virtual memory region during runtime. Each entry can include a timestamp. The list can be updated, during runtime, according to usage of the virtual memory regions. For example, for each allocation of a virtual memory region that is committed, the timestamp from the corresponding entry can be removed. Virtual memory regions allocated to, but not used by, the computer program can be indicated according to the list.

The present invention also relates to a method of runtime analysis of a computer program including detecting reservations of virtual memory regions during runtime of the computer program, detecting commitments of virtual memory regions during runtime of the computer program, and creating an entry within a list of existing virtual memory regions for each reservation and each commitment of a virtual memory region during runtime. The list can be updated according to the virtual memory regions that are freed and virtual memory regions that are committed. The method further can include indicating virtual memory regions allocated to, but not used by, the computer program according to the list.

The present invention also relates to a computer program product including a computer-usable medium having computer-usable program code that, when executed by an information processing system, performs the various steps and/or functions described herein.

BRIEF DESCRIPTION OF THE SEVERAL VIEWS OF THE DRAWINGS

FIG. 1 is a flow chart illustrating a method in accordance with one aspect of the present invention.

FIG. 2 is a flow chart illustrating a method in accordance with another aspect of the present invention.

DETAILED DESCRIPTION OF THE INVENTION

Figure 3:
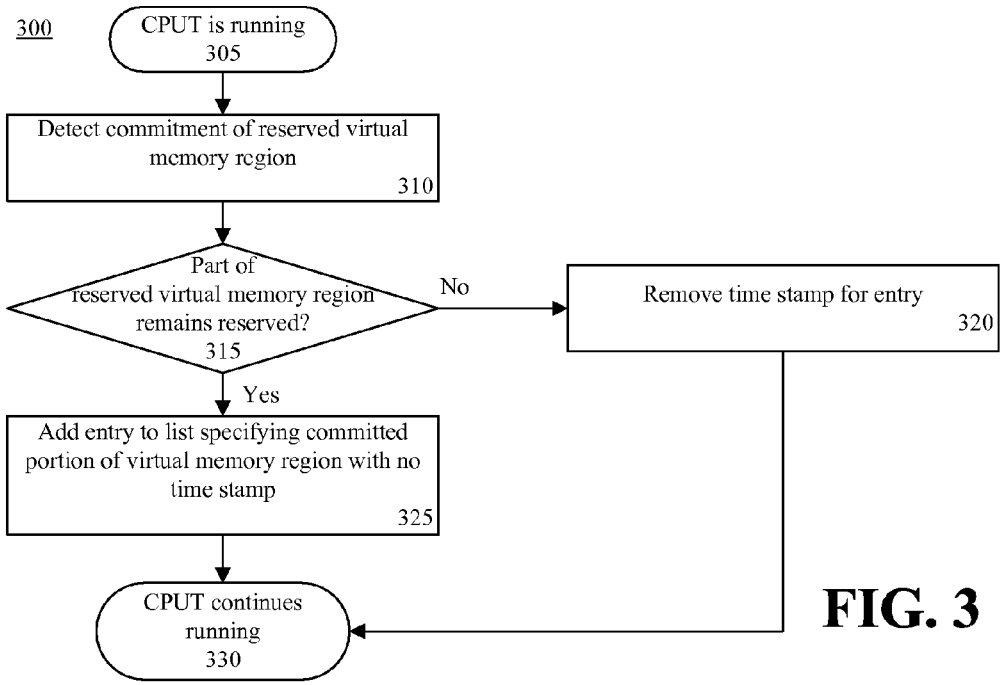
FIG. 3 is a flow chart illustrating a method in accordance with another aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to monitoring usage of virtual memory by computer programs during runtime. More particularly, the present invention relates to detecting virtual memory that, while allocated to a computer program for use, goes unused. A computer program can be instrumented with analysis and monitoring code using a runtime analysis tool. The instrumented computer program, referred to as the "computer program under test" (CPUT), can execute. Requests from the CPUT relating to usage of virtual memory can be identified and logged. As the CPUT continues to execute, the virtual memory regions that are allocated to the computer program can be identified as well as those virtual memory regions that are allocated and used. A report can be provided that indicates those virtual memory regions that, while allocated to the CPUT, were not used by CPUT during execution.

Within modern operating systems, virtual memory can exist in several different states. By way of example, "free" virtual memory refers to virtual memory, e.g., a page, which is not committed or reserved. As such, free virtual memory is not available for a process of a computer program until allocated to the computer program or process in some fashion. As used herein, the term "allocated" can refer to reserving virtual memory, committing virtual memory, or both reserving and committing virtual memory.

"Reserved" virtual memory can refer to a portion of virtual memory, i.e., a range of addresses referred to as a virtual memory region, which cannot be used by other allocation functions of an operating system. Typically, reserved virtual memory is not available for use by other components of the same program that are running under the same process. The virtual memory region, however, is not yet accessible to the computer program for which the reserved virtual memory was reserved until the reserved virtual memory region is associated with physical storage, i.e., committed.

The function "VirtualAlloc" within a Windows® type of operating system from Microsoft® Corporation can reserve, or reserve and commit, a free virtual memory region. The function "VirtualAlloc", for example, can commit a reserved virtual memory region, but cannot reserve the virtual memory region a second time. A function such as "VirtualFree" within a Windows® type of operating system can release a reserved virtual memory region, thereby making it a free virtual memory region.

As noted, committed virtual memory refers to virtual memory that has been reserved and associated with physical storage. Committed virtual memory is accessible to a computer program or process. The operating system typically loads committed pages of virtual memory into physical memory on demand, e.g., responsive to the first attempt to read or write to that virtual memory region. The function "VirtualFree" can decommit a committed virtual memory region or can decommit and release a committed virtual memory region.

One example of a runtime analysis tool that can be used to implement the various functions described herein is Rational® PurifyPlus™ from International Business Machines Corporation of Armonk, N.Y., (IBM®). Rational® Purifyplus™ is an example of a runtime analysis tool capable of instrumenting code and functioning cooperatively with the instrumented computer program during execution. (IBM, Rational, and PurifyPlus are trademarks of International Business Machines Corporation in the United States, other countries, or both).

Thus, a runtime analysis tool can instrument a CPUT with code for monitoring or detecting when the CPUT invokes functions relating to virtual memory management. Such functions can include, but are not limited to, "VirtualAlloc", "VirtualFree", or any other function that is known to deal with the allocation and de-allocation of virtual memory for a computer program. These and other aspects of the present invention will be described with reference to the figures below.

Those skilled in the art will recognize that the products discussed within this specification are intended to provide a basis for teaching one skilled in the art to better understand the embodiments disclosed herein. The mention of any particular product, however, is not intended to limit the present invention in any way. For example, the embodiments disclosed herein can be implemented as a standalone application, as a component or "plug-in" that is used as part of a larger application, or in virtually any appropriately detailed structure, computer program, and/or portion thereof.

In one embodiment, the runtime analysis tool can execute in conjunction with the CPUT. In that case, the runtime analysis tool can execute at the same time as, and cooperatively with, the CPUT. Accordingly, the runtime analysis tool can intercept virtual memory management functions invoked by the CPUT to track virtual memory usage. In another embodiment, the runtime analysis tool can insert within, or instrument, the CPUT with appropriate code for performing the various steps described herein. In that case, the runtime analysis tool need not execute in conjunction with the CPUT. Rather, the CPUT can execute in a modified form which includes the inserted code from the runtime analysis tool. In such an embodiment, the added code within the CPUT can implement the functions described herein. Thus, it should be appreciated that reference to the runtime analysis tool can refer to either embodiment.

The present invention can detect when the CPUT invokes various functions that deal with virtual memory usage. Various states of virtual memory and functions for managing virtual memory have been discussed herein for purposes of illustration only. Those skilled in the art will recognize that different operating systems may utilize different functions and different states which may approximate those discussed herein. Accordingly, the present invention is not intended to be limited by the particular type of function or state of virtual memory that is used, or operating system for that matter.

FIG. 1 is a flow chart illustrating a method 100 in accordance with one aspect of the present invention. More particularly, FIG. 1 illustrates an aspect of the present invention relating to detecting when virtual memory is reserved or committed. The method 100 can begin in step 105, where the CPUT is running in conjunction with the runtime analysis tool. In step 110, a commitment or reservation of virtual memory for the CPUT can be detected. For example, any calls to "VirtualAlloc" from the CPUT that request a virtual memory region be committed or reserved can be identified or intercepted.

In step 115, an entry for the detected allocation of virtual memory can be created within a list of existing virtual memory regions. The list can specify any virtual memory region that has been allocated. Each virtual memory region can be represented by a corresponding entry in the list specifying the addresses of the virtual memory region. Appreciably, the range expresses a size, or amount, of virtual memory that is allocated, where the addresses indicate the bounds of the range. In step 120, call stack information specifying the contents of the call stack at the time the allocation of virtual memory is detected can be stored in, or as part of, the entry for the detected allocation of the virtual memory region.

In step 125, a determination can be made as to whether the allocated memory is reserved for the computer program, but not committed. If the virtual memory region is reserved, but not committed, the method can proceed to step 130. In step 130, a timestamp can be stored in the entry for the detected allocation of the virtual memory region. If, however, the virtual memory region is also committed, the method can continue to step 135. In step 135, the CPUT can continue to run. The method 100 can repeat as may be required as further allocations of virtual memory regions are detected.

FIG. 2 is a flow chart illustrating a method 200 in accordance with another aspect of the present invention. More particularly, FIG. 2 illustrates an aspect of the present invention relating to detecting when virtual memory is freed. The method can begin in step 205 where the CPUT can be running. In step 210, the freeing of a virtual memory region, i.e., a range of virtual memory, can be detected. For example, when the CPUT invokes the function "VirtualFree", such an event can be detected. Accordingly, the virtual memory region that is freed using the function can be noted.

In step 215, the list of existing virtual memory regions can be updated. In one embodiment, the entry corresponding to the virtual memory region that is freed by the function "VirtualFree" can be removed from the list. In another embodiment, the entry corresponding to the virtual memory region that is freed can be updated to indicate that the virtual memory region is now free. In step 220, the CPUT can continue to run and the method can repeat as may be required.

FIG. 3 is a flow chart illustrating a method 300 in accordance with another aspect of the present invention. More particularly, FIG. 3 illustrates an aspect of the present invention relating to detecting when reserved virtual memory is committed. The method 300 can begin in step 305 where the CPUT can be running. In step 310, the commitment of reserved memory can be detected. As noted, this can entail detecting the CPUT calling the function "VirtualAlloc" and requesting the commitment of a reserved virtual memory region.

In step 315, a determination can be made as to whether part of the reserved virtual memory region remains reserved. More particularly, responsive to identifying a request to commit an entire reserved virtual memory region, as specified by an entry in the list of existing virtual memory regions, the method can continue to step 320. In step 320, the timestamp can be removed from the entry in the list. The timestamp is no longer needed for reporting purposes since the entire virtual memory region that was reserved for use by the CPUT has been committed and, therefore, used by the CPUT.

If the request to commit virtual memory specifies a range that is less than the entire reserved virtual memory region specified by an entry in the list of existing virtual memory regions, the method can continue to step 325. In other words, a block of virtual memory is reserved for the CPUT and only a portion of that block is committed. In step 325, an entry can be added to the list of existing virtual memory regions without a timestamp. The entry specifies the portion of the reserved virtual memory region that is committed.

It should be appreciated that the combination of the original entry specifying the reserved virtual memory region in combination with the entry made in step 325 indicating the portion of the virtual memory region now committed, collectively, indicate which portions of the originally reserved virtual memory region remain reserved and uncommitted, e.g., unused. In step 330, the CPUT can continue to run. The method can repeat as may be required.

Figure 4:
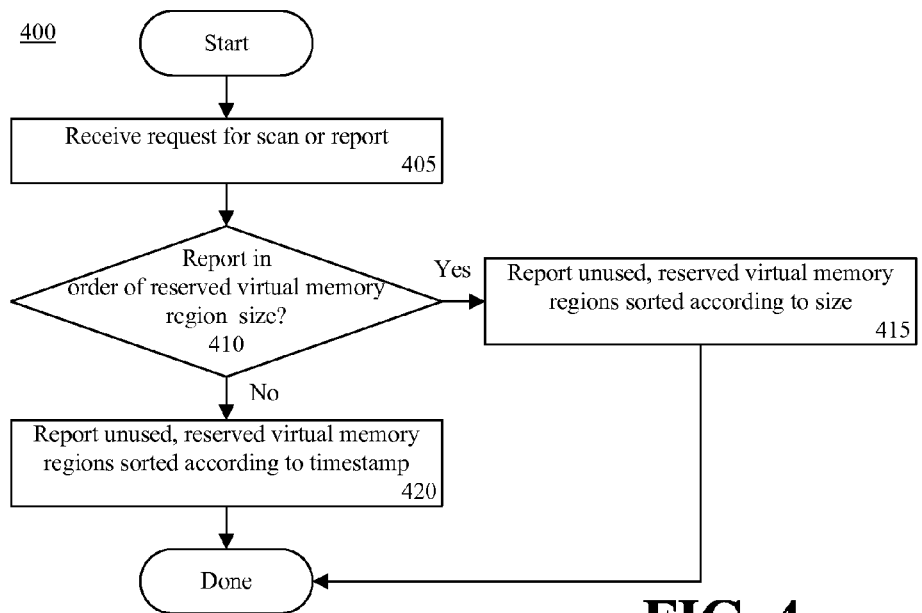
FIG. 4 is a flow chart illustrating a method in accordance with another aspect of the present invention.

FIG. 4 is a flow chart illustrating a method 400 in accordance with another aspect of the present invention. More particularly, FIG. 4 illustrates an aspect of the present invention relating to scanning and reporting unused virtual memory regions. The method 400 can be performed as the CPUT continues to execute or after the CPUT has finished execution. In either case, any data collected during runtime of the CPUT can be analyzed, sorted, filtered, and/or processed as described.

In step 405, a request for a scan or report can be received by the runtime analysis tool. The request can specify that any entries from the list of existing virtual memory regions indicating virtual memory regions that have been reserved by the CPUT, but not committed, are to be provided. In step 410, a determination can be made as to whether the request asks for the data to be sorted according to the size of the virtual memory regions. If so, the method can proceed to step 415, where the entries corresponding to non-committed, reserved virtual memory regions can be sorted according to size. For example, the entries corresponding to the largest virtual memory regions can be presented first, or last, according to user preference.

If the request does not indicate that the list should be sorted according to size, the method can proceed to step 420. In step 420, the list can be sorted according to the timestamps. For example, reserved virtual memory regions that are not committed can be presented with the earliest timestamp first, or last, according to user preference. In either case, as each entry also specifies stack information indicating the state of the stack as it existed when the entry was made, the stack information also can be presented or otherwise made available, whether in the same or a different report.

The reporting options disclosed herein have been presented for purposes of illustration only and, as such, are not intended to limit the present invention. Those skilled in the art will appreciate that the entries, or data from the entries, can be sorted and/or filtered according to any parameter or item of data included within the entries. Further, the data can be presented in a graphical form and within a dynamic view if so desired. In any case, the stack information indicates which portions of the CPUT are responsible for reserving and not using virtual memory.

Throughout the specification, reference has been made to particular functions, for example, "VirtualAlloc" and "VirtualFree". These functions have been provided for purposes of illustration only and are not intended to limit the embodiments disclosed herein to any particular type of operating system. Those skilled in the art will recognize that the present invention can be implemented on, or extended to, any of a variety of different operating systems and that the particular functions used to manage virtual memory will change from one operating system to another.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of runtime analysis of a computer program comprising:
    detecting allocations of virtual memory regions during runtime of the computer program;
    creating an entry within a list of existing virtual memory regions for each allocation of a virtual memory region during runtime, each entry comprising a timestamp;
    updating the list, during runtime, according to usage of the virtual memory regions comprising for each allocation of a virtual memory region that is committed, removing the timestamp from the corresponding entry; and
    indicating virtual memory regions allocated to, but not used by, the computer program according to the list.

2. The method of claim 1, further comprising:
    determining a time stamp for each allocation of a virtual memory region;
    including the timestamps within the corresponding entries in the list; and
    sorting the entries of the list according to the timestamps.

3. The method of claim 1, further comprising:
    determining a size for each allocation of a virtual memory region;
    including the size within the corresponding entries in the list; and
    sorting the entries of the list according to size.

4. The method of claim 1, wherein detecting allocations further comprises detecting commitments of virtual memory regions or reservations of virtual memory regions.

5. The method of claim 4, further comprising:
    determining call stack information responsive to each detected allocation; and
    including the call stack information in each corresponding entry.

6. The method of claim 4, further comprising including a timestamp within the entry for each allocation of a virtual memory region that is reserved for the computer program, but not committed.

7. The method of claim 1, wherein updating the list further comprises updating the entries in the list to indicate allocations of virtual memory regions that are free.

8. The method of claim 1, wherein updating the list further comprises, for allocated virtual memory regions comprising a committed portion and a reserved portion, adding an entry to the list specifying the committed portion, wherein the entry does not specify a time stamp.

9. A computer program product comprising:
a computer-usable device having computer-usable program code that performs runtime analysis of a computer program, said computer program product including:
computer-usable program code that detects allocations of virtual memory regions during runtime of the computer program;
computer-usable program code that creates an entry in a list of existing virtual memory regions for each allocation of a virtual memory region during runtime, each entry comprising a timestamp;
computer-usable program code that updates the list, during runtime, according to usage of the virtual memory regions comprising for each allocation of a virtual memory region that is committed, removing the timestamp from the corresponding entry; and
computer-usable program code that indicates virtual memory regions allocated to, but not used by, the computer program according to the list.

10. The computer program product of claim 9, further comprising:
computer-usable program code that determines a timestamp for each allocation of a virtual memory region;
computer-usable program code that includes the timestamps within the corresponding entries in the list; and
computer-usable program code that sorts the entries of the list according to the timestamps.

11. The computer program product of claim 9, further comprising:
computer-usable program code that determines a size for each allocation of a virtual memory region;
computer-usable program code that includes the size within the corresponding entries in the list; and
computer-usable program code that sorts the entries of the list according to size.

12. The computer program product of claim 9, wherein the computer-usable program code that detects allocations further comprises computer-usable program code that detects commitments of virtual memory regions or reservations of virtual memory regions.

13. The computer program product of claim 12, further comprising:
computer-usable program code that determines call stack information for each detected allocation; and
computer-usable program code that includes the call stack information in each corresponding entry.

14. The computer program product of claim 12, further comprising computer-usable program code that includes a timestamp within the entry for each allocation of a virtual memory region reserved for the computer program, but not committed.

15. The computer program product of claim 9, wherein the computer-usable program code that updates the list further comprises computer-usable program code that updates the entries in the list to indicate allocations of virtual memory regions that are free.

16. The computer program product of claim 9, wherein the computer-usable program code that updates the list further comprises computer-usable program code that, for each allocation of a virtual memory region having both a committed portion and a reserved portion, adds an entry to the list specifying the committed portion, wherein the entry does not specify a timestamp.

17. A method of runtime analysis of a computer program comprising:
detecting reservations of virtual memory regions during runtime of the computer program;
detecting commitments of virtual memory regions during runtime of the computer program;
creating an entry within a list of existing virtual memory regions for each reservation and each commitment of a virtual memory region during runtime;
updating the list according to virtual memory regions that are freed and virtual memory regions that are committed; and
indicating virtual memory regions allocated to, but not used by, the computer program according to the list;
wherein creating an entry within the list of existing virtual memory regions for each reservation and each commitment of a virtual memory region during runtime comprises including a timestamp within each entry; and
wherein updating the list according to virtual memory regions that are freed and virtual memory regions that are committed comprises removing the timestamp from each entry corresponding to virtual memory regions that are freed and virtual memory regions that are committed.

* * * * *